United States Patent
Waissi et al.

(10) Patent No.: US 11,143,462 B2
(45) Date of Patent: Oct. 12, 2021

(54) PANEL FOR HEAT EXCHANGE AND IMPROVED NOISE REDUCTION FOR A TURBOMACHINE

(71) Applicant: SAFRAN AIRCRAFT ENGINES, Paris (FR)

(72) Inventors: Bellal Waissi, Moissy-Cramayel (FR); Sébastien Chalaud, Moissy-Cramayel (FR); Lancelot Guillou, Moissy-Cramayel (FR); Jacky Novi Mardjono, Moissy-Cramayel (FR); Guillaume Mathon-Margueritte, Moissy-Cramayel (FR); Georges Jean Xavier Riou, Moissy-Cramayel (FR); Claude Sensiau, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 49 days.

(21) Appl. No.: 15/517,085

(22) PCT Filed: Oct. 23, 2015

(86) PCT No.: PCT/FR2015/052856
§ 371 (c)(1),
(2) Date: Apr. 5, 2017

(87) PCT Pub. No.: WO2016/066936
PCT Pub. Date: May 6, 2016

(65) Prior Publication Data
US 2017/0292795 A1    Oct. 12, 2017

(30) Foreign Application Priority Data
Oct. 29, 2014  (FR) ...................... 1460375

(51) Int. Cl.
*F01N 1/00* (2006.01)
*F28F 3/04* (2006.01)
(Continued)

(52) U.S. Cl.
CPC .............. *F28F 3/046* (2013.01); *F01N 1/023* (2013.01); *F02C 7/045* (2013.01); *F02C 7/12* (2013.01);
(Continued)

(58) Field of Classification Search
CPC .. F01N 1/023; F01N 1/02; F02C 7/045; F02C 7/14; F02C 7/12; F02C 7/24;
(Continued)

(56) References Cited

U.S. PATENT DOCUMENTS 6,134,783 A * 10/2000 Bargman ................ B21C 23/20
29/890.03
7,891,410 B1 * 2/2011 Monson .................... F28F 3/02
165/80.2
(Continued)

FOREIGN PATENT DOCUMENTS

| EP | 1612769 A2 | 1/2006 |
|---|---|---|
| EP | 1916399 A2 | 4/2008 |

OTHER PUBLICATIONS

Written Opinion of the International Searching Authority dated Apr. 14, 2016, issued in corresponding International Application No. PCT/FR2015/052856, filed Oct. 23, 2015, 4 pages.
(Continued)

*Primary Examiner* — Harry E Arant
(74) *Attorney, Agent, or Firm* — Christensen O'Connor Johnson Kindness PLLC

(57) ABSTRACT

A heat exchange and noise reduction panel the panel for an aircraft comprising: an external surface intended to be swept by an airflow and from which fins extend along a first and
(Continued)

a second main predetermined direction; cavities forming Helmholtz resonators, linked to the first ends of channels for the passage of air, the second ends of which communicate with said airflow, such that said channels form necks, referred to as Helmholtz resonators, extending substantially along the first direction; and at least one oil flow chamber extending between said external surface and said at least one cavity, and intended to discharge the thermal energy carried by the oil, wherein said channels are formed, at least in part, inside said fins.

10 Claims, 3 Drawing Sheets

(51) Int. Cl.
    *F02C 7/12*     (2006.01)
    *F02C 7/24*     (2006.01)
    *F28F 3/02*     (2006.01)
    *F28D 1/03*     (2006.01)
    *F28D 9/00*     (2006.01)
    *F01N 1/02*     (2006.01)
    *F02C 7/045*     (2006.01)
    *F02C 7/14*     (2006.01)
    *F28D 21/00*     (2006.01)

(52) U.S. Cl.
    CPC ................ *F02C 7/14* (2013.01); *F02C 7/24* (2013.01); *F28D 1/0391* (2013.01); *F28D 9/0081* (2013.01); *F28F 3/02* (2013.01); *F28D 2021/0021* (2013.01); *F28D 2021/0049* (2013.01); *F28F 2265/28* (2013.01); *Y02T 50/60* (2013.01)

(58) Field of Classification Search
    CPC ..... F28D 2021/0019; F28D 2021/0021; F28D 2021/0026; F28D 9/0081; F28D 1/0391; F28D 1/03; F28D 9/00; F28F 2265/28; F28F 2265/30; F28F 3/046; F28F 3/02; Y02T 50/60; Y02T 50/675; Y02T 50/671
    USPC ........................................ 165/135, 136, 164
    See application file for complete search history.

(56) References Cited

U.S. PATENT DOCUMENTS

| | | | |
|---|---|---|---|
| 8,235,171 B2* | 8/2012 | Douglas | G10K 11/172 181/292 |
| 9,909,471 B2* | 3/2018 | Mattia | F02K 1/827 |
| 2009/0317238 A1 | 12/2009 | Wood et al. | |
| 2010/0155016 A1* | 6/2010 | Wood | F01D 25/12 165/51 |
| 2011/0303398 A1* | 12/2011 | Scott | F01M 5/002 165/135 |

OTHER PUBLICATIONS

International Preliminary Report on Patentability dated May 2, 2016, issued in corresponding International Application No. PCT/FR2015/052856, filed Oct. 23 2015, 1 page.

International Search Report dated Apr. 14, 2016, issued in corresponding International Application No. PCT/FR2015/052856, filed Oct. 23, 2015, 2 pages.

Written Opinion of the International Searching Authority dated Apr. 14, 2016, issued in corresponding International Application No. PCT/FR2015/052856, filed Oct. 23, 2015, 5 pages.

* cited by examiner

PANEL FOR HEAT EXCHANGE AND IMPROVED NOISE REDUCTION FOR A TURBOMACHINE

TECHNICAL FIELD

The present invention relates to a heat exchange and noise reduction panel for a turbine engine, in particular of an aircraft.

PRIOR ART

A turbine engine, such as a bypass turbojet engine, conventionally comprises an air inlet having a fan, the air flow at the output of which is divided into an air flow that enters the engine and forms a hot flow, or primary flow, and an air flow that flows around the engine and forms a cold flow, or secondary flow.

The engine typically comprises, from upstream to downstream, in the direction of gas flow, at least one compressor, a combustion chamber, at least one turbine, and an exhaust nozzle in which the combustion gases leaving the turbine and forming the primary flow are mixed with the secondary flow.

The fan of the turbine engine is surrounded by a fan housing which is integrated in the nacelle of the turbine engine. It is known to line the inner surface of said housing with acoustic panels in order to limit the propagation of the noise generated by the fan.

The housing may also be provided with surface air cooled oil coolers (SACOC). A heat exchanger of this kind comprises an outer surface which is intended for being swept over by the secondary air flow and on which fins are located, and at least one oil circulation chamber extending below the outer surface. The outer surface is intended to discharge thermal energy generated by the oil. Depending on the design of the engine, the amount of thermal energy from the oil which has to be dissipated may be a very significant amount, it being possible for the oil to reach temperatures of approximately 160° C.

Some turbine engines have nacelles that have a relatively short longitudinal dimension. Therefore, there is little space for installing equipment and in particular heat exchangers and acoustic panels used to attenuate the noise from the fan.

The size and integration of equipment therefore become significant issues, particularly with regard to the installation of heat exchangers and acoustic panels in the flow path of the secondary flow.

U.S. Pat. No. 8,544,531 already proposes that the functions of the air/oil exchanger and the functions of acoustic treatment be integrated in the same piece of equipment so that there is no longer any competition between the two requirements in a single installation space.

The present invention proposes an improvement to this technology, which makes it possible in particular to optimise the design and arrangement of the functions of air/oil heat exchange and the functions of acoustic treatment in a single installation space.

SUMMARY OF THE INVENTION

The invention proposes a heat exchange and noise reduction panel for a turbine engine, in particular of an aircraft, the panel comprising:
an outer surface which is intended for being swept over by an air flow and from which fins extend in a first predetermined main direction and a second predetermined main direction, which directions are preferably substantially perpendicular,
recesses which form Helmholtz resonators and are connected to first ends of air-passage channels, second ends of which communicate with said air flow, such that said channels form necks of said Helmholtz resonators that extend substantially in the first direction of the fins,
at least one oil circulation chamber which extends between said outer surface and said at least one recess and is intended for discharging thermal energy generated by the oil,
the stack consisting of said outer surface, said at least one recess and said at least one chamber extending substantially in the first predetermined direction, characterised in that said channels are formed at least in part inside said fins.

In the present application, a Helmholtz resonator is understood to mean an acoustic system comprising a generally small neck which is connected to a larger recess capable of resonating. The neck ensures that the sound waves to be attenuated and the recess are in communication. Once the system has been optimised, the neck provides for visco-thermal dissipation (quick and alternating movements of the sound waves, through the necks, that dissipate sound energy by friction). Frequency tuning, i.e. optimisation allowing these maximum speeds for frequencies to be attenuated to be reached, is performed primarily by the volume in the resonant recesses, i.e. the dimensions thereof and in particular the height thereof. It should be noted that, owing to the thermal environment, the local temperatures may be taken into account in order to properly optimise the system.

The invention thus proposes that the aforementioned functions of the air/oil heat exchanger and the aforementioned functions of acoustic treatment be combined in the same piece of equipment in the form of a panel. Furthermore, for a given tuned frequency, the invention makes it possible to reduce the size of the air recesses of the resonators as a result of channels which are significantly longer. In terms of acoustics, in order to optimise the operation of the system at a given frequency, making the necks (channels) of the resonators longer makes it possible to increase the mass of moving air and thus compensate for the low volume of the resonant recesses. Moreover, the reduction in the volume of the resonant recesses has a positive impact on the equipment. Indeed, it would be possible to either reduce the overall size of the equipment or increase the volume of the oil chamber in order to thus reduce the loss of pressure generated by the channels in the oil chamber.

The panel according to the invention may comprise one or more of the following features, taken in isolation or in combination with one another:
the fins are substantially normal or inclined with respect to the outer surface,
said channels open onto walls of the fins to form openings for bleeding air from said air flow,
a plurality of channels pass through each fin,
the channels have a substantially rectangular, circular or elliptical cross section,
the panel has a curved general shape and is designed to form a sector of an annular heat exchange and noise reduction casing, for example for a turbine engine nacelle,
the channels have a constant cross section or a general shape which is flared towards said recesses,
at least some of said recesses communicate with one another, and said first direction is substantially perpendicular to said outer surface or inclined with respect to said outer surface.

The present invention also relates to a turbine engine, in particular of an aircraft, characterised in that said engine comprises at least one panel as described above.

DESCRIPTION OF THE FIGURES

The invention will be better understood and other details, features and advantages of the invention will become apparent upon reading the following description given by way of non-limiting example and with reference to the accompanying drawings, in which.

DETAILED DESCRIPTION

Figure 1:
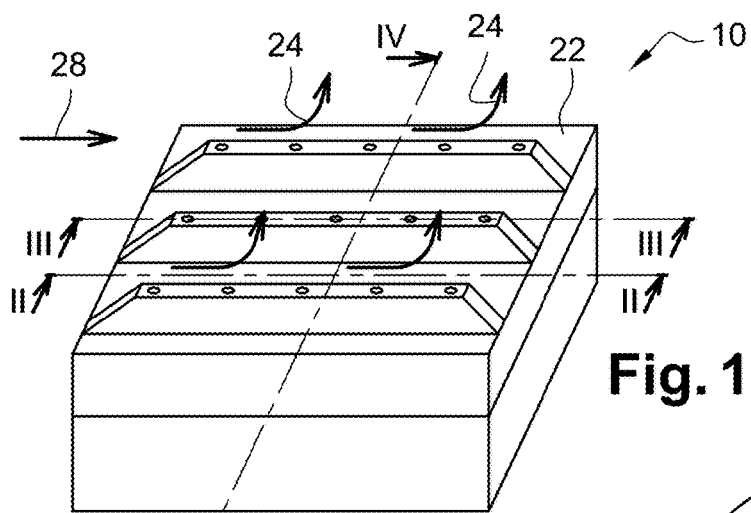
FIG. 1 is a very schematic perspective view of a heat exchange and noise reduction panel according to the invention.

Reference is first made to FIGS. 1 to 5 which show an embodiment of a heat exchange and noise reduction panel 10 according to the invention for a turbine engine of an aircraft.

In the following description, terms such as "below", "under", "on", "above", "upper", "lower", etc. are to be understood relative to the orientation of the figures. Similarly, dimensions are given on the basis of this orientation of the figures. Therefore, "height" refers to a dimension extending vertically or from the bottom to the top (or vice versa), and "thickness", "length" and "width", or even "distance", are to be understood to mean dimensions measured in a substantially horizontal plane.

The panel 10 essentially comprises three portions or superposed layers, namely:
an outer portion 12 intended to be exposed to a cooling air flow, such as a secondary air flow of the turbine engine,
an intermediate portion 14 having a chamber 16 for circulating oil to be cooled, and
an inner portion 18 having air recesses 20.

The portions 12 and 14 form a SACOC surface heat exchanger and the portions 12, 14 and 18 form an acoustic panel having Helmholtz resonators.

The outer portion 12 comprises an outer surface 22 which is intended to be swept over by the air flow 24 and on which fins 26 are located. The fins 26 extend from the surface 22 in a first main direction, in this case the vertical direction, and in a second main direction, in this case the horizontal direction. The first direction and the second direction are substantially perpendicular. The horizontal direction perpendicular to the first direction and the second direction is defined as being the third direction. Air flows between the fins 26 that are intended in particular for increasing the surface area of the surfaces for exchanging heat with the air. In the example shown, the fins 26 are preferably rectilinear, parallel and independent, i.e. they are not interconnected.

Other arrangements are however conceivable, as will be explained below. In the example shown, the outer surface 22 is shown having a shape which is substantially square or rectangular. Although the surface 22 is shown in the drawings as being planar, said surface could also have a curved shape, in particular if the panel 10 is curved so as to make it easier to mount in an annular housing of the turbine engine, for example. A panel 10 which has a curved general shape is designed to form a sector of an annular heat exchange and noise reduction casing (see FIG. 4), for example for a turbine engine nacelle.

The fins 26 extend over substantially the entire length or longitudinal direction of the surface 22 in the second, horizontal direction. The number of fins is defined in a known manner, depending in particular on the exchange conditions to be met.

The oil circulation chamber 16 extends below the outer surface 22 over substantially the entire extent thereof. Said chamber is connected to an oil inlet and an oil outlet, which are not shown in the drawings. The flow direction and the flow orientation of the oil in the chamber may be the same as that/those of the air on the surface 22 (arrow 28) or may be different therefrom.

Figure 7:
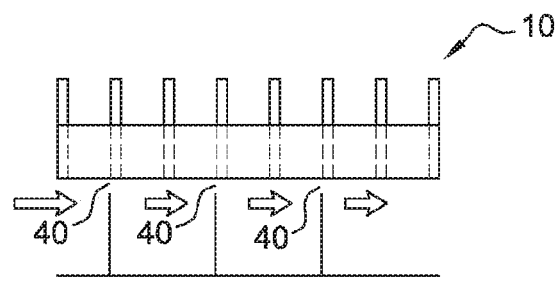
Figure 8:
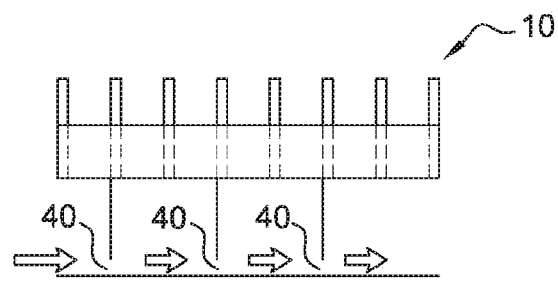

The air recesses 20 in the third portion 18 are located below the oil chamber 16. Said recesses are preferably regularly distributed and substantially identical. Said recesses extend side by side in the same plane which is substantially parallel to the surface 22. Said recesses 20 are connected to lower longitudinal ends of air-passage channels 30, the upper longitudinal ends of which form openings 32 for communicating with the sound source to be attenuated. The assembly formed by the channels 30 and the recesses 20 forms Helmholtz resonators, the channels forming necks and the recesses forming resonant recesses of the resonators. At least some of the recesses 20 can communicate with one another, as is shown in FIGS. 7 and 8.

Figure 2:
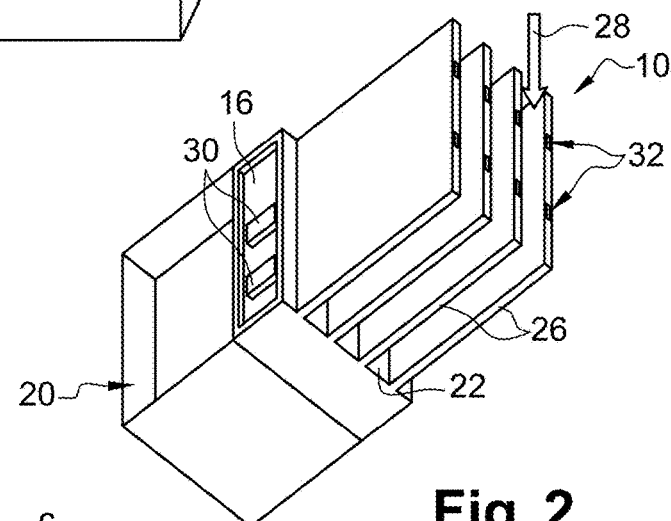
FIG. 2 is a perspective cross section along line II-II in FIG. 1.
Figure 3:
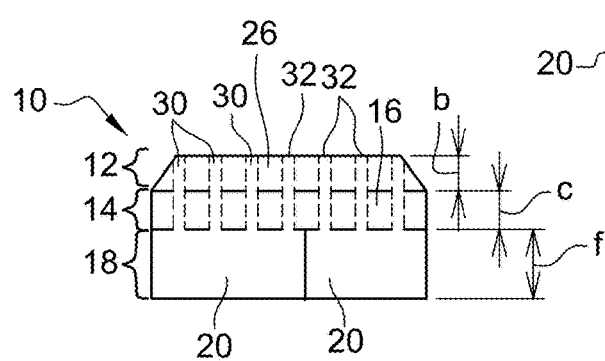
FIG. 3 is cross section along line III-III in FIG. 1.
Figure 4:
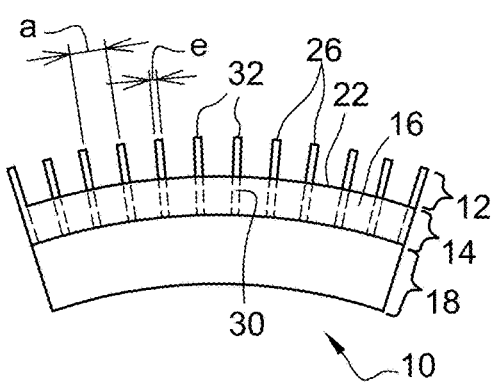
FIG. 4 is a cross section along line IV-IV in FIG. 1, but with a curved general shape designed to form a sector of an annular heat exchange and noise reduction casing.
Figure 5:
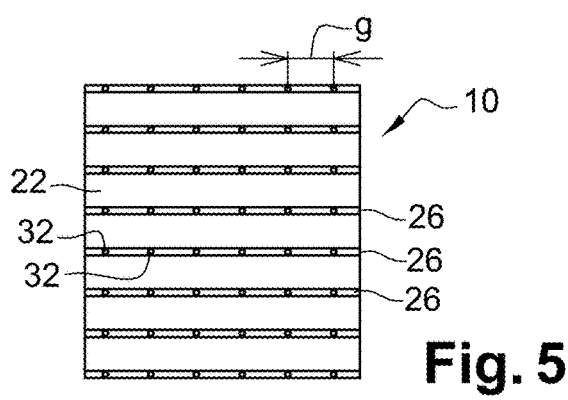
FIG. 5 is a plan view of the panel from FIG. 1, FIGS. 6 to 9 are views similar to that of FIG. 4, showing other variants of the invention.

The invention proposes a panel having a reduced size owing to at least a portion of the channels 30 being formed inside the fins 26. As can be seen in the example shown, the channels 30 are oriented in a substantially rectilinear and vertical manner and comprise lower portions which extend into the oil chamber 16 and upper portions which extend into the fins 26. Moreover, in the particular case shown, the upper ends of the channels 30 open onto walls of the fins, in particular on the tops or upper free ends of the fins 26 and form the aforementioned communication openings 32. In FIG. 2, a plurality of channels 30 pass through each fin 26.

The channels 30 are preferably distributed in a matrix. Therefore, the channels 30 are distributed in lines and columns in the oil chamber 26. In the example shown, each fin 26 comprises a row of openings 32.

The panel 10 according to the invention can have the following dimensions, which are optimised for attenuating the acoustic frequencies of a turbine engine, namely frequencies of between 400 and 2,000 Hz, to the greatest extent possible:
the fins 26 have a thickness e (i.e. a dimension in the third direction) of between 0.5 and 2 mm and are spaced apart from one another by a distance a (in the third direction) of between 1 and 5 mm,
the oil chamber 16 has a height c (in the first, vertical direction) of between 1 and 10 mm,
the channels 30 have an average diameter d of between 1 and 2 mm,
the recesses 20 have a height f (in the first, vertical direction) of between 5 and 150 mm, and the perforation level a of said outer surface is between 5% and 10%. This perforation level is equal to the ratio of the cumulative cross section of the openings 32 (n.π. $(d/2)^2$, n being the number of openings 32 or channels 30) to the area A of the surface of the resonators, which is considered to be substantially equal to that of the outer surface 22. The difference between the surface area of the outer surface and that of the resonators may be negligible. The resonators are separated by walls that reduce the surface area thereof relative to that of the outer surface. At first approximation, however, the two surface areas are equal.

"Average diameter" is understood to mean the diameter of a channel when said channel is cylindrical, the average of the diameters of a channel when said channel has a non-constant circular cross section and when said channel is flared or frustoconical, for example, and the diameter of a circular cross section that is equivalent to the cross section of the channel when said channel is not circular and is for example rectangular.

The tuned frequency of a Helmholtz resonator can be estimated using the following formula:

$$\text{Tuned frequency} = \frac{C}{2\pi}\sqrt{\frac{S}{Vl'}}$$

where

C:   speed of the sound          (m/s)
S:   cross section of the neck   (m²)
V:   volume of the resonator     (m³)
l':  corrected neck length       (m)  or $l' = l + \delta$ where l:   geometrical neck length     (m)
δ:   neck correction
$$\begin{cases} \delta = 1.7\, r(1 - 0.7\sqrt{\sigma}) \\ \text{for juxtaposed resonators} \end{cases}$$
r:   radius of an opening        (m)
σ:   perforation level In this formula, the cross section of the neck S is the aforementioned cross section of an opening 32, the volume of the resonator V is the volume of one recess 20, and the length of the neck I or I' substantially equates to the sum of the thickness c of the oil chamber 16 and the height b of the fins 26.

Advantageously:
the fins 26 have a height b (in the first, vertical direction) of between 10 and 25 mm, and
openings 32 in the same row are spaced apart from one another by a distance g (in the second direction) of between 1.57 and 31.42 mm. The spacing between the openings of two adjacent rows equates to the spacing a (in the third direction) between two adjacent fins 26.

Figure 6:
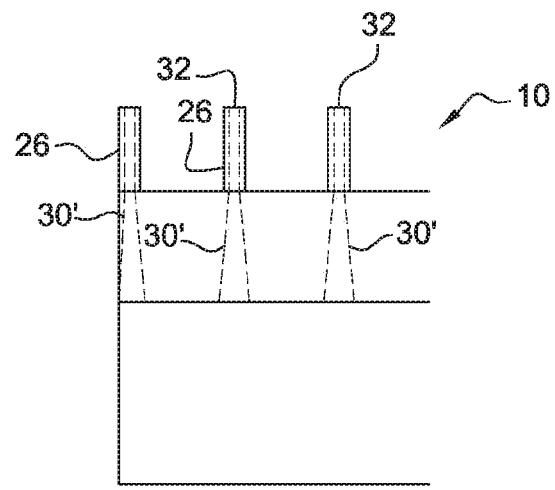

The channels 30 have longitudinal axes which are substantially perpendicular to said outer surface 22 or inclined with respect to said outer surface 22. Said channels have a cylindrical longitudinal general shape having a constant or parallelepiped cross section in the example shown in FIGS. 1 to 5. Said channels could have a different shape and be for example frustoconical or flared towards the recesses 20, as shown in FIG. 6. The channels 30' in FIG. 6 have an inlet cross section, i.e. a cross section measured at the opening 32 by which the channel 30 opens onto the surface 22, that is smaller than the opposed cross section, referred to as the outlet cross section. The channels 30 have a substantially rectangular, circular or elliptical cross section. This makes it possible in particular to limit the reduction in the width of the frequency band of attenuation generated by the length of the channels 30', i.e. by the height of the oil chamber 16.

Moreover, as shown in FIGS. 7 and 8, air passages 40 could be provided between the resonant recesses 20 in order to optimise heat exchange therebetween, but to the detriment of acoustic performance. This option also makes it possible to overcome problems relating to the expansion of the partitions which define the recesses 20. These air passages can be located in the region of the upper ends of the recesses (FIG. 7) or in the region of the lower ends thereof (FIG. 8).

Figure 9:
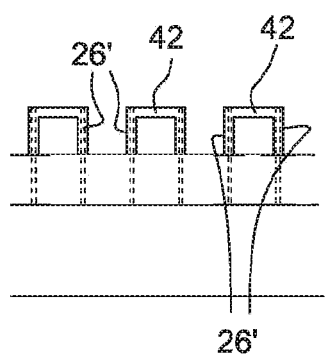
Figure 10:
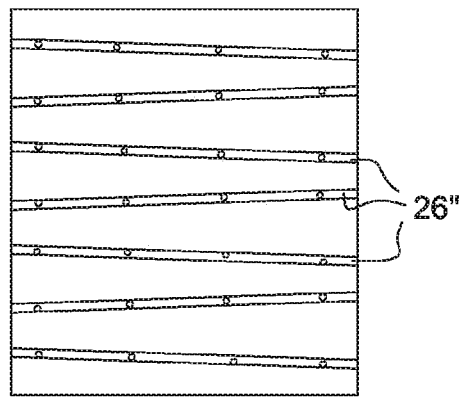
FIGS. 10 and 11 are views similar to that of FIG. 5, showing further variants of the invention.
Figure 11:
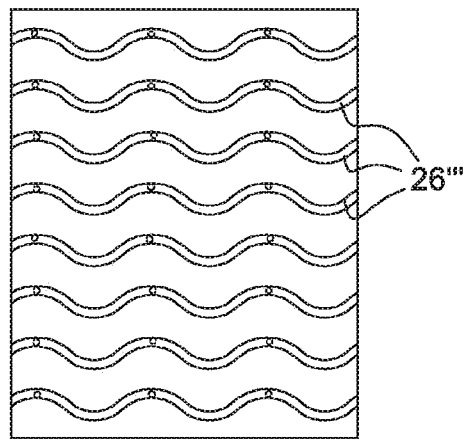

FIGS. 9 to 11 show other arrangement variants, the performance of which is slightly less satisfactory by comparison with that of rectilinear, parallel and independent fins. In the variant in FIG. 9, the fins are no longer independent of one another but are instead interconnected in pairs. The upper end of each fin 26' is connected to the upper end of an adjacent fin 26' by a bridge of material 42. In the variant in FIG. 10, the fins 26" are rectilinear but not strictly parallel. In the variant in FIG. 11, the fins 26''' have an undulating (not rectilinear) general shape and are largely parallel in the second extension direction.

The invention offers a solution to the real need for finding a means for integrating the functions of the air/oil exchanger and the functions of acoustic treatment in the same piece of equipment so that there is no longer any competition between the two requirements in a single installation space.

Although the invention relates in particular to an aircraft turbine engine in the above description, it also relates to any kind of turbine engine.

The invention claimed is:

1. A heat exchange and noise reduction panel for an aircraft turbine engine comprising:
    an outer surface which is intended for being swept over by an air flow and from which fins extend in a first predetermined main direction and a second predetermined main direction, wherein the first predetermined main direction is perpendicular to the second predetermined main direction,
    recesses and air-passage channels that cooperatively form Helmholtz resonators wherein each recess is connected to a first end of a corresponding one of the air-passage channels, a second end of which communicates with said air flow, such that said channels form necks of said Helmholtz resonators that extend through an interior of a corresponding one of the fins in the first direction of the fins and open on distal ends of the fins,
    at least one oil circulation chamber which extends between said outer surface and said recesses and is intended for discharging thermal energy from the oil,
    a stack consisting of said outer surface, said recesses and said at least one oil circulation chamber extending in the first direction,
    wherein said channels extend uninterrupted from a corresponding one of the recesses to the distal end of the fin without any intervening apertures.

2. The heat exchange and noise reduction panel according to claim 1, wherein the fins are substantially normal or inclined with respect to the outer surface.

3. The heat exchange and noise reduction panel according to claim 1, wherein said channels open onto walls of the fins to form openings for communicating with a sound source to be attenuated.

4. The heat exchange and noise reduction panel according to claim 1, wherein a plurality of said channels pass through each fin.

5. The heat exchange and noise reduction panel according to claim 1, wherein the channels have a substantially rectangular, circular or elliptical cross section.

6. The heat exchange and noise reduction panel according to claim 1, wherein said panel has a curved general shape and is designed to form a sector of an annular heat exchange and noise reduction casing.

7. The heat exchange and noise reduction panel according to claim 1, wherein the channels have a constant cross section or a general shape which is flared towards said recesses.

8. The heat exchange and noise reduction panel according to claim 1, wherein at least some of said recesses communicate with one another.

9. The heat exchange and noise reduction panel according to claim 1, wherein said channels have longitudinal axes which are substantially perpendicular to said outer surface or inclined with respect to said outer surface.

10. An aircraft turbine engine which comprises at least one heat exchange and noise reduction panel according to claim 1.

\* \* \* \* \*